United States Patent
Duda et al.

(10) Patent No.: US 11,623,404 B2
(45) Date of Patent: Apr. 11, 2023

(54) REMOVAL OF EXCESS BUILD MATERIAL IN ADDITIVE MANUFACTURING

(71) Applicant: HEWLETT-PACKARD DEVELOPMENT COMPANY, L.P., Houston, TX (US)

(72) Inventors: Michael Duda, Vancouver, WA (US); Justin M. Roman, Vancouver, WA (US); Joel V. Pickard, Vancouver, WA (US)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 691 days.

(21) Appl. No.: 16/075,632

(22) PCT Filed: Apr. 24, 2017

(86) PCT No.: PCT/US2017/029131
§ 371 (c)(1),
(2) Date: Aug. 4, 2018

(87) PCT Pub. No.: WO2018/199894
PCT Pub. Date: Nov. 1, 2018

(65) Prior Publication Data
US 2021/0206092 A1    Jul. 8, 2021

(51) Int. Cl.
*B29C 64/35*        (2017.01)
*B33Y 30/00*       (2015.01)
(Continued)

(52) U.S. Cl.
CPC .............. *B29C 64/35* (2017.08); *B08B 7/02* (2013.01); *B22F 10/68* (2021.01); *B28B 11/22* (2013.01);
(Continued)

(58) Field of Classification Search
CPC ....... B29C 64/35; B29C 64/393; B28B 11/22; B33Y 40/20; B33Y 30/00; B33Y 50/02; B08B 7/02; B22F 10/68; B22F 10/85
See application file for complete search history.

(56) References Cited

U.S. PATENT DOCUMENTS 4,859,070 A    8/1989  Musschoot
5,688,464 A *  11/1997  Jacobs ................... B33Y 40/00
                                                    427/601
(Continued)

FOREIGN PATENT DOCUMENTS

| EP | 3053731 A1 | 10/2018 |
|----|------------|---------|
| JP | 2007331791 A | 12/2007 |
| WO | 2017/017274 A1 | 2/2017 |

OTHER PUBLICATIONS

Yang et al., "Metering and Dispensing of Powder; the Quest for New Solid Freeforming Techniques", Powder Technology, vol. 178, Issue No. 1, Abstract, Retrieved from Internet: http://www.sciencedirect.com/science/article/pii/S0032591007002094, Sep. 5, 2007, 3 pages.

*Primary Examiner* — Nahida Sultana
(74) *Attorney, Agent, or Firm* — Shook, Hardy & Bacon L.L.P.

(57) ABSTRACT

A three-dimensional (3D) printer and method of additive manufacture are disclosed. The method includes building a three-dimensional (3D) object via a 3D printing process. After the 3D printing process, the 3D object is contained within a cake comprising the 3D object and partially fused excess build material. The method further includes vibrating the cake to loosen the excess build material. The frequency of the vibration is swept across a predetermined range of frequencies over a predetermined sweep interval.

11 Claims, 3 Drawing Sheets

(51) Int. Cl.
  *B33Y 40/20* (2020.01)
  *B22F 10/68* (2021.01)
  *B08B 7/02* (2006.01)
  *B28B 11/22* (2006.01)
  *B33Y 50/02* (2015.01)
  *B29C 64/393* (2017.01)
  *B22F 10/85* (2021.01)
  *B22F 10/28* (2021.01)

(52) U.S. Cl.
  CPC .............. *B33Y 30/00* (2014.12); *B33Y 40/20* (2020.01); *B22F 10/28* (2021.01); *B22F 10/85* (2021.01); *B29C 64/393* (2017.08); *B33Y 50/02* (2014.12)

(56) References Cited

U.S. PATENT DOCUMENTS

| | | | |
|---|---|---|---|
| 9,394,104 B2 | 7/2016 | Hamilton et al. | |
| 9,550,235 B2 | 1/2017 | Scalzo et al. | |
| 9,604,247 B2 * | 3/2017 | Grinberg | B41F 19/004 |
| 10,406,751 B2 * | 9/2019 | Fulop | B08B 3/12 |
| 10,967,577 B2 * | 4/2021 | Swartz | B33Y 10/00 |
| 2002/0090410 A1 * | 7/2002 | Tochimoto | B29C 64/357 |
| | | | 425/215 |
| 2004/0084814 A1 * | 5/2004 | Boyd | B33Y 40/00 |
| | | | 264/497 |
| 2008/0236613 A1 * | 10/2008 | Hsiao | B08B 7/02 |
| | | | 134/1 |
| 2008/0241404 A1 | 10/2008 | Allaman et al. | |
| 2011/0240671 A1 | 10/2011 | Mcdiarmid et al. | |
| 2014/0294517 A1 | 10/2014 | Harvey et al. | |
| 2015/0183166 A1 | 7/2015 | Yoo et al. | |
| 2015/0258744 A1 | 9/2015 | Muller et al. | |
| 2016/0074910 A1 | 3/2016 | Fujii | |
| 2016/0074940 A1 | 3/2016 | Cote et al. | |
| 2016/0318253 A1 * | 11/2016 | Barnhart | B23K 26/342 |
| 2017/0072646 A1 * | 3/2017 | Sakura | B33Y 10/00 |
| 2017/0144382 A1 * | 5/2017 | Ott | B24B 5/06 |
| 2017/0297303 A1 * | 10/2017 | Swartz | B29C 43/20 |
| 2017/0363377 A1 * | 12/2017 | Phillips | B22F 12/90 |
| 2019/0201982 A1 * | 7/2019 | Lombardo | B33Y 40/20 |
| 2019/0315065 A1 * | 10/2019 | Hutchinson | B29C 64/35 |
| 2020/0166482 A1 * | 5/2020 | Gold | B22F 12/00 |

* cited by examiner

REMOVAL OF EXCESS BUILD MATERIAL IN ADDITIVE MANUFACTURING

BACKGROUND

Additive manufacturing (AM) may include three-dimensional (3D) printing to generate 3D objects. In some AM processes, successive layers of material are formed under computer control to fabricate the object. The material may be powder including metal, plastic, concrete, composite material, and other types of build material. The objects can be various shapes and geometries, and produced via a model such as a 3D model or other electronic data source. The fabrication may involve laser melting, laser sintering, electron beam melting, fused deposition, and so on. The model and automated control may facilitate the layered manufacturing and additive fabrication. As for applications, AM may fabricate intermediate and end-use products for aerospace (e.g., aircraft), machine parts, medical devices (e.g., implants), automobile parts, fashion products, structural and conductive metals, ceramics, conductive adhesives, semiconductor devices, and other applications.

BRIEF DESCRIPTION OF THE DRAWINGS

Certain examples are described in the following detailed description and in reference to the drawings, in which.

DETAILED DESCRIPTION OF SPECIFIC EXAMPLES

The present disclosure describes techniques for fluidization of build material in additive manufacturing. More specifically, the disclosure describes techniques in which the build material is fluidized by applying a vibration to the build material such that the frequency of the vibration is swept across a range of frequencies. The frequency sweep technique has been shown to be much more effective than applying vibrations at a single fixed frequency. The frequency sweep technique enables fluidization of build material to be achieved with lower amplitude vibrations.

Various stages of the 3D printing process may benefit from the fluidization techniques disclosed herein. For example, after a 3D object has been formed via selective layer melting, the 3D object may be encased within block of partly fused excess build material, sometimes referred as a "cake." Retrieval of the 3D object has generally involved removing the 3D object from the cake by hand. The techniques described herein can be used to automatically remove the excess build material, or a substantial portion thereof, as part of a preprogrammed build material removal process controlled by the 3D printing system. The disclosed fluidization technique can also be used in other components of a 3D printer to induce flow of the build material throughout the 3D printing system or mix build materials.

Figure 1:
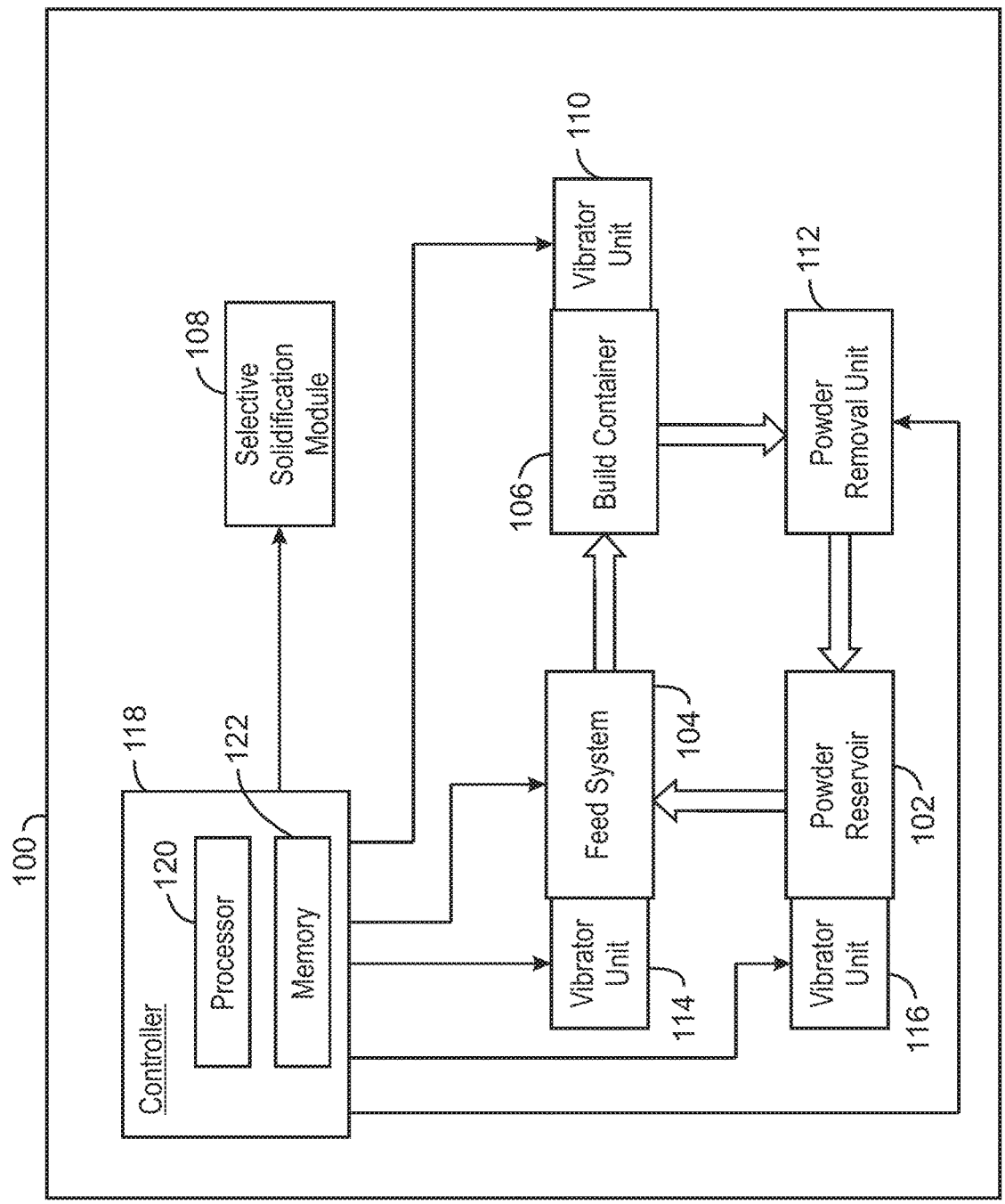
FIG. 1 is a block diagram of an example 3D printer.

FIG. 1 is a block diagram of an example 3D printer. The 3D printer 100 is a computer-controlled system that forms 3D objects in a layer-by-layer additive fabrication process. The 3D printed objects can be various shapes and geometries, and produced via a model such as a 3D model or other electronic data source. This fabrication by the 3D printer 100 may involve laser melting, laser sintering, electron beam melting, and so on. The 3D printer 100 may fabricate objects as intermediate and end-use products for aerospace (e.g., aircraft), machine parts, medical devices (e.g., implants), automobile parts, fashion products, structural and conductive metals, ceramics, conductive adhesives, semiconductor devices, and other applications.

The 3D printer 100 includes a powder reservoir 102, a feed system 104, and a build container 106. The powder reservoir 102 holds the build material used to build the 3D objects. The build material may be plastic powder, metal powder, composite materials, or other types of build materials. The feed system 104 transfers the build material from the powder reservoir 102 to the build container 106 and forms a powder bed within the build container 106. The build container 106 may be open at the top and can include a build platform disposed on a piston (not shown) that moves downward as the product is being formed to facilitate the computer-controlled layer-by-layer fabrication.

The 3D printer also includes a selective solidification module 108, which forms the 3D object by causing selected portions of the powder bed to fuse together. The selective solidification module 108 may use any additive manufacturing technique that causes cohesion between particles in selected areas of the powder bed through heating, the addition of chemical fusion agents, or other techniques. In this way, 3D objects can be fabricated in successive layers of deposited build material. For example, the selective solidification module 108 can include a laser that scans the surface of the powder bed to cause selected portions of the build material to melt (selective laser melting) or sinter (selective laser sintering).

After the 3D object is fully formed, the 3D object will be contained within a cake inside the build container 106, which includes the 3D printed objects and excess build material. To facilitate removal of the 3D objects, the 3D printer can initiate a build material removal process. Due to incidental heating of the excess build material during the building process, the excess build material may be partially fused. To effectively remove the excess build material, the 3D printer fluidizes the excess build material by activating a vibrator unit 110 coupled to the build container 106. The build container 106 may be coupled to structural members of the 3D printer 100 through dampening mechanisms such as springs to isolate the vibrations to the build container 106.

During the build material removal process, a powder removal unit 112 may be activated to remove the fluidized build material from the build container 106. For example, the powder removal unit 112 can remove the excess build material by vacuum, gravity, pneumatic conveying, or mechanical conveying, or any combination thereof. The vibrator unit 110 and powder removal unit 112 may be activated simultaneously throughout the duration of the build material removal process. In some examples, the 3D printer does not include the powder removal unit 112 and 3D printed parts may be manually removed from the build container 106 after cake breakup.

In some examples, the excess build material may be recirculated back to the powder reservoir 102 for use in subsequent 3D printing operations. In such systems, additional equipment may be used to further process the build material, including screens or shakers to remove relatively large particles or conglomerated powder. In some examples, the excess build material removed from the build container 106 may be removed from the system and discarded or stored separately for later processing and possible reuse.

The frequency of the vibration delivered to the build container 106 may be any frequency or combination of frequencies suitable for cake breakup, and may include a single frequency, a set of two or more combined frequencies, random noise frequencies, and the like. In some examples, the frequency of the vibration delivered to the build container 106 is swept across a range of frequencies. The frequency sweep agitates the build material throughout a range of frequencies causing it to expand and aerate, resulting in powder movement, cake breakup, and fluidization. The frequency sweep method has been shown to be much more effective than applying a single fixed frequency. The frequency sweep enables fluidization at lower amplitudes than those achievable by vibrating at a fixed frequency.

The frequency sweep spans a range of frequencies from an initial frequency to a second frequency at the end of the frequency sweep range. The initial frequency may be referred to herein as the start frequency, $f_{start}$, and the second frequency at the end of the frequency sweep range may be referred to as the stop frequency, $f_{stop}$. The length of time that the vibration frequency takes to travel from the start frequency to the stop frequency is referred to herein as the sweep interval.

The frequency sweep can be implemented in a variety of different configurations. For example, the frequency sweep can be from a high frequency to a low frequency ($f_{start} > f_{stop}$) or from a low frequency to a high frequency ($f_{start} < f_{stop}$). Additionally, the vibration frequency may be subject to several frequency sweeps during the build material removal process. For example, the vibration frequency may continuously cycle between the start frequency and stop frequency at a sweep rate. As used herein, the term sweep rate refers to the number of sweep cycles per second and is the inverse of the sweep interval. Additionally, the frequency sweep may progress across the range of frequencies in a continuous manner or may progress in steps, for example, 1 hz steps, 5 hz, 10 hz steps, etc.

In some examples, the vibration frequency may be subject to a single frequency sweep during the build material removal process. For example, the vibration frequency may start at the start frequency, move to the stop frequency, and remain at the stop frequency for the remainder of the build material removal process.

The frequency sweep can be controlled in accordance with a preprogrammed sweep routine. For example, the range of vibration frequencies and the manner of conducting the frequency sweep may be predetermined and specified as part of a preprogrammed process carried out by the 3D printer. Accordingly, the build material removal process can be completely or substantially automated and may involve little or no manual adjustment or intervention.

The frequency sweep can span any suitable range of frequencies and may depend in part on the type of build material used, the size of the build container, the depth of the cake, and other factors. In some examples, the start frequency may be between 50 and 60 hertz and the stop frequency may be between 15 and 30 hertz. The amplitude of the vibrations may depend in part on the type of build material used, the size of the build container, and other factors. The amplitude of the vibrations may be approximately 1 to 5 gravities (g). For example, the amplitude of the vibrations may be approximately 2 g. In some examples, the amplitude and frequency range of the vibration can be selected by a user prior to initiating the build process.

The fluidization techniques described above can also be used in other components of the 3D printer. For example, additional vibrator units 114 and 116 may be coupled to the feed system 104, the powder reservoir 116, or any other component that may benefit from fluidization of the build material. For example, fluidizing the build material in the powder reservoir 102 can help stimulate flow from the powder reservoir 102 to the feed system 104. This may be particularly useful to initiate flow in situations where the build material has settled or consolidated over time.

The 3D printer also includes a controller 118 that electronically controls the various components of the 3D printer, including the feed system 104, scanner 108, the powder removal unit 112, and the vibrator units 110, 114, and 116. The controller 118 orchestrates the build process and the build material removal process in accordance with its programming.

In some examples, the controller includes a processor 120 and memory 122. The processor 120 may be a microprocessor, a single core processor, a multi-core processor, a multithreaded processor, an ultra-low voltage processor, an embedded processor, or any other type of processors. The processor 120 may be a part of a System-On-a-Chip (SoC) in which the processor 120 and other components of the controller 118 are formed into a single integrated circuit or on a single circuit board.

The controller 118 also includes memory 122, which may include volatile and non-volatile memory types. The memory 122 may include system memory such as random access memory (RAM), static random access memory (SRAM), dynamic RAM, and the like. The memory 122 can also include non-volatile memory types such as a solid-state drive (SSD), flash memory, micro hard drives, hard drives, and the like for storage of programming code used to operate the printer, 3D models representing the object to be printed, and others. In some examples, the memory 122 can store one or more frequency sweep routines to be carried out by the 3D printer 100 and orchestrated by the controller 118. The frequency sweep routines may specify various factors, such as the start frequency, stop frequency, sweep interval, sweep rate, sweep style (e.g., single sweep, repetitive sweep, etc). If more than one frequency sweep routine is stored, the frequency sweep routine to be implemented may be selected by the user.

The controller 118 may send commands to other components of the 3D printer over a bus, which may include any number of technologies, such as industry standard architecture (ISA), extended ISA (EISA), peripheral component interconnect (PCI), peripheral component interconnect extended (PCIx), PCI express (PCIe), or any number of other technologies. The bus may include a proprietary bus, for example, used in a SoC based system.

It will be appreciated that the 3D printer shown in FIG. 1 is one example of a 3D printer that can employ the build material fluidization techniques described herein, and that the present techniques may also be applicable to other types of 3D printers. Furthermore, it is to be understood that the block diagram of FIG. 1 is not intended to indicate that the 3D printer 100 is to include all of the components shown in FIG. 1. Rather, the 3D printer 100 can include fewer or additional components not illustrated in FIG. 1.

Figure 2:
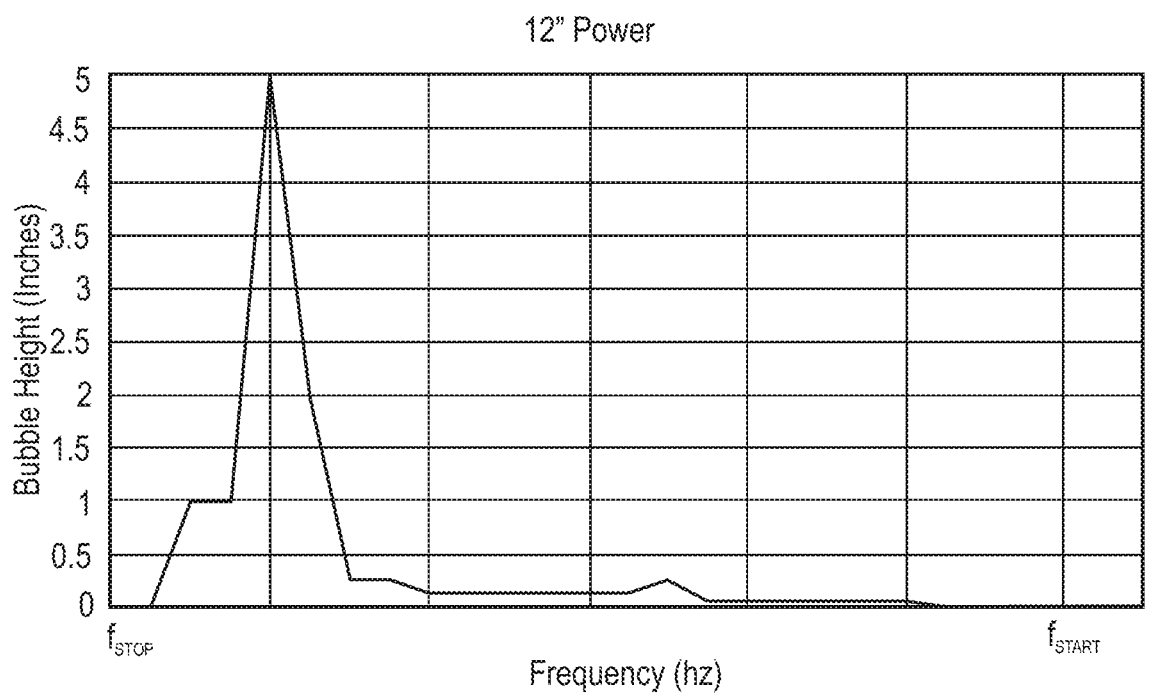
FIG. 2 is a graph showing the effectiveness of build material fluidization by the example frequency sweep technique.

FIG. 2 is a graph showing the effectiveness of build material fluidization by the frequency sweep technique. To generate the results shown in FIG. 2, a clear four-inch diameter tube was filled with powder to a height of 12 inches and run through a frequency sweep on a vibration table. In this example, the vibration was swept from a high frequency to a low frequency. The vibration of the powder results in powder agitation and increases the height of the powder. At certain resonant frequencies, the powder agitation results in geysers.

In the graph, the X-axis represents the vibration frequency, and the Y-axis represents the height of the powder level above the initial height. If geysers are created, the height is the height of the geyser. As seen in the graph, the vibration frequency was swept from a start frequency, $f_{START}$, to a stop frequency of, $f_{STOP}$. Additionally, the amplitude of the vibration was approximately 2 g. This resulted in maximum geyser height of approximately 5 inches at 25 hertz, which indicates effective powder fluidization. Furthermore, it has been observed that the same powder movement could not be initiated as easily for a discrete frequency. However, once the powder is in motion the sweep can be paused and movement will continue when held at a single frequency within the active range.

It was also observed that the powder is much more reactive to frequency down sweeps ($f_{start}$>$f_{stop}$) than frequency up sweeps over the same frequency range. Frequency down sweeps often resulted in 10 times greater powder activity at the resonant frequency compared to frequency up sweeps. Additionally, the powder activity peaks at different frequencies depending on the powder column height. As the column height decreases, the peak active frequency increases.

Figure 3:
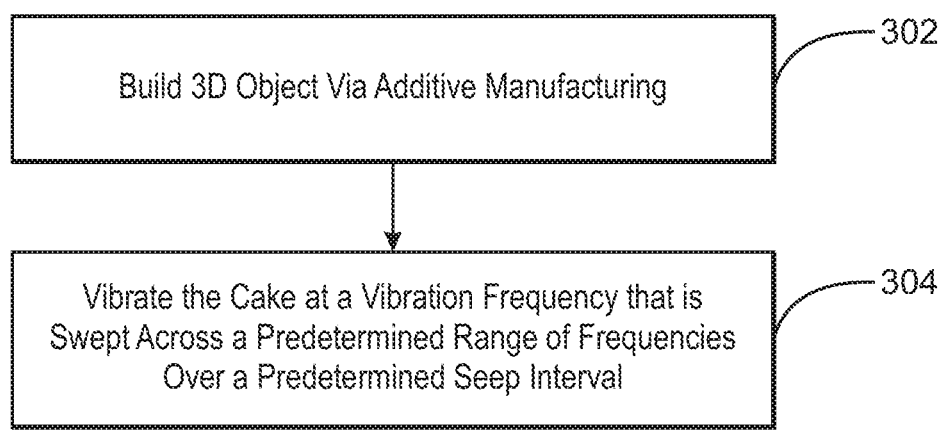
FIG. 3 is a process flow diagram for a method of additive manufacture according to one example.

FIG. 3 is a process flow diagram for a method of additive manufacture. The method 300 may be implemented in any suitable 3D printer, including the 3D printer 100 shown in FIG. 1. The method begins at block 302.

At block 302, a 3D object is built during a 3D printing process. The 3D printing process may be in the manner described above with regard to FIG. 1. At the end of the 3D printing process, the 3D object is contained within a cake comprising the 3D object and excess build material, some of which may be partially fused.

At block 304, a build material removal process is initiated, during which the cake is vibrated to loosen the excess build material. The frequency of the vibration is swept across a predetermined range of frequencies over a predetermined sweep interval. For example, the vibration frequency may be swept from a predetermined start frequency to a predetermined stop frequency, wherein the predetermined start frequency is higher than the predetermined stop frequency.

Additionally, the frequency of the vibration may cycle between the predetermined range of frequencies at a sweep rate, or the frequency of the vibration may be swept from the start frequency to the stop frequency and then held at the stop frequency during the remainder of the build material removal process. In some examples, the loosened build material may be automatically reclaimed for subsequent builds by collecting the build material via a vacuum unit coupled to the build container.

Fewer or greater actions can be included in the method 300 depending on the design considerations of a particular implementation. For example, the method may also include automatically detecting the activity of the build material through sensors and adjusting the frequency of the vibration based on the detected build material activity.

While the present techniques may be susceptible to various modifications and alternative forms, the examples discussed above have been shown by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method of additive manufacture, comprising:
   providing a three-dimensional (3D) object completed via a 3D printing process, wherein after the 3D printing process is completed the 3D object is contained within a cake comprising the 3D object and excess build material; and
   vibrating the cake to fluidize and remove the excess build material, wherein vibrating the cake comprises vibrating the cake at a plurality of frequencies by applying to the cake a vibration frequency that is swept across a predetermined range of frequencies over a predetermined sweep interval in a continuous manner, wherein the vibration frequency is swept from a predetermined start frequency of between 50 and 60 hertz to a predetermined stop frequency of between 15 and 30 hertz.

2. The method of claim 1, wherein the vibration frequency cycles between the predetermined range of frequencies at a sweep rate.

3. The method of claim 1, wherein vibrating the cake at the plurality of frequencies further comprises holding the vibration frequency at the predetermined stop frequency during a build material removal process.

4. The method of claim 1, wherein vibrating the cake at the plurality of frequencies further comprises vibrating the cake at multiple fixed vibration frequencies.

5. The method of claim 1, wherein vibrating the cake at the plurality of frequencies further comprises vibrating the cake at a spectrum of random noise frequencies.

6. A three-dimensional (3D) printer system comprising:
   a powder feed system to feed build material to a build container;
   a selective solidification module to form a 3D object from the build material in the build container;
   a vibrator unit coupled to the build container; and
   a controller configured to:
      form the 3D object; and
      after the 3D object is formed, control the vibrator unit during a preprogrammed build material removal process to deliver a vibration to the build container by sweeping across a predetermined range of vibration frequencies in a continuous manner over a predetermined sweep interval to fluidize and remove excess build material from the 3D object, wherein the predetermined range of vibration frequencies is swept from a predetermined start frequency of between 50 and 60 hertz to a predetermined stop frequency of between 15 and 30 hertz.

7. The 3D printer system of claim 6, wherein a frequency of the vibration cycles between the predetermined start frequency and the predetermined stop frequency at a sweep rate.

8. The 3D printer system of claim 6, wherein the predetermined range of vibration frequencies is further held at the predetermined stop frequency during a build material removal process.

9. The 3D printer system of claim 6, comprising a powder removal unit coupled to the build container, wherein the controller activates the powder removal unit during the preprogrammed build material removal process to reclaim excess build material loosened by the vibration.

10. A method of operating a three-dimensional (3D) printer, comprising:

forming a 3D object within a powder bed contained in a build container; and after complete formation of the 3D object, during a build material removal process:

delivering a vibration to the build container at a vibration frequency to fluidize excess build material contained in the build container, wherein the vibration frequency is swept across a predetermined range of frequencies in a continuous manner over a predetermined sweep interval, wherein the vibration frequency is swept from a predetermined start frequency of between 50 and 60 hertz to a predetermined stop frequency of between 15 and 30 hertz to remove excess build material from the 3D object; and removing the excess build material from the build container via a powder removal unit coupled to the build container.

11. The method of claim 10, comprising, after the vibration frequency is swept from the predetermined start frequency to the predetermined stop frequency, holding the vibration frequency at the predetermined stop frequency for a remainder of the build material removal process.

\* \* \* \* \*